(12) United States Patent
Biglari et al.

(10) Patent No.: US 11,319,611 B2
(45) Date of Patent: May 3, 2022

(54) METHOD FOR ROLLING AND/OR HEAT TREATING A METAL STRIP

(71) Applicant: SMS Group GmbH, Duesseldorf (DE)

(72) Inventors: Mostafa Biglari, Stuttgart (DE); Holger Behrens, Erkrath (DE); Carsten Andreas Klein, Düsseldorf (DE); Christian Klinkenberg, Herdecke (DE); Lutz Kuemmel, Jüchen (DE); Ulrich Sommers, Düsseldorf (DE)

(73) Assignee: SMS GROUP GMBH, Duesseldorf (DE)

( * ) Notice: Subject to any disclaimer, the term of this patent is extended or adjusted under 35 U.S.C. 154(b) by 902 days.

(21) Appl. No.: 16/084,595

(22) PCT Filed: Mar. 3, 2017

(86) PCT No.: PCT/EP2017/054978
§ 371 (c)(1),
(2) Date: Sep. 13, 2018

(87) PCT Pub. No.: WO2017/157692
PCT Pub. Date: Sep. 21, 2017

(65) Prior Publication Data
US 2019/0071750 A1    Mar. 7, 2019

(30) Foreign Application Priority Data

Mar. 14, 2016 (DE) .......................... 102016204147.9
Nov. 17, 2016 (DE) .......................... 102016222644.4

(51) Int. Cl.
*C21D 11/00* (2006.01)
*C21D 8/02* (2006.01)
(Continued)

(52) U.S. Cl.
CPC .............. *C21D 11/005* (2013.01); *B21B 1/22* (2013.01); *B21B 37/74* (2013.01); *B21B 37/76* (2013.01);
(Continued)

(58) Field of Classification Search
CPC ......... C21D 11/005; B21B 1/22; B21B 37/74; B21B 2001/225
See application file for complete search history.

(56) References Cited

U.S. PATENT DOCUMENTS

| 4,274,273 | A | 6/1981 | Fapiano |
| 4,715,053 | A | 12/1987 | Comstock |

(Continued)

FOREIGN PATENT DOCUMENTS

| CN | 101168797 | 4/2008 |
| CN | 102392119 | 3/2012 |

(Continued)

OTHER PUBLICATIONS

Makinouchi, A. "Sheet metal forming simulation in industry." Journal of materials processing technology 60.1-4 (1996): pp. 19-26. (Year: 1996).*

(Continued)

*Primary Examiner* — Satish Rampuria
(74) *Attorney, Agent, or Firm* — Abelman, Frayne & Schwab

(57) ABSTRACT

The invention relates to a method for rolling a metal product (1), wherein the metal product is subjected to a rolling operation at a first station (2), which rolling operation is controlled by a control device (3), wherein the product (1) is subject to a measurement at a second station (4), wherein the product (1) is subjected to a further processing operation at a third station (6), and wherein the product (1) is in a specified quality at a fourth station (7). In order to increase (Continued)

the quality of the produced strip, the invention provides that the method has the following steps: a) measuring the value of a material property (IW) that the second station (4); b) feeding the value measured at the second station (4) to the control device (3), comparing the measured value with a value (SW) stored in the control device (3), and adjusting a parameter (PPI) if the measured value deviates from the stored value (SW), e) measuring a value of a quality material property (Q) at the fourth station (7); d) comparing the measured value with a stored value, and initiating a measure to influence the quality material property (Q) if the measured value deviates from the stored value beyond a permissible tolerance.

14 Claims, 1 Drawing Sheet

(51) Int. Cl.

| | | |
|---|---|---|
| B21B 37/76 | (2006.01) | |
| C21D 8/04 | (2006.01) | |
| C21D 9/46 | (2006.01) | |
| B21B 37/74 | (2006.01) | |
| G05B 19/418 | (2006.01) | |
| B21B 1/22 | (2006.01) | |
| C21D 9/56 | (2006.01) | |
| C21D 9/573 | (2006.01) | |
| C23C 2/28 | (2006.01) | |
| C23C 2/40 | (2006.01) | |
| G01N 23/2055 | (2018.01) | |
| G05B 13/02 | (2006.01) | |

(52) U.S. Cl.
CPC ............. *C21D 8/02* (2013.01); *C21D 8/0205* (2013.01); *C21D 8/0226* (2013.01); *C21D 8/0263* (2013.01); *C21D 8/0278* (2013.01); *C21D 8/0426* (2013.01); *C21D 9/46* (2013.01); *C21D 9/562* (2013.01); *C21D 9/573* (2013.01); *C23C 2/28* (2013.01); *C23C 2/40* (2013.01); *G01N 23/2055* (2013.01); *G05B 19/41875* (2013.01); *B21B 2001/225* (2013.01); *G05B 13/02* (2013.01)

(56) References Cited

U.S. PATENT DOCUMENTS

| | | |
|---|---|---|
| 6,430,461 B1 | 8/2002 | Andorfer |
| 6,546,310 B1 | 4/2003 | Doell |
| 6,821,361 B2 | 11/2004 | Fujimura |
| 7,092,833 B2 | 8/2006 | Moore |
| 7,648,042 B2 | 1/2010 | Kwon |
| 9,157,892 B2 | 10/2015 | Makino |
| 9,732,396 B2 | 8/2017 | Roessiger |
| 2002/0000180 A1* | 1/2002 | Ebner ............... C21D 9/66 110/336 |
| 2006/0117549 A1 | 8/2006 | Plocoennik |
| 2009/0173434 A1 | 7/2009 | Muroga |
| 2009/0229712 A1* | 9/2009 | Ylimainen ............... F27B 9/12 148/508 |
| 2010/0219567 A1 | 4/2010 | Imanari |
| 2014/0014238 A1* | 1/2014 | Carpenter ............... C21D 6/02 148/541 |
| 2016/0076119 A1 | 3/2016 | Linzer |
| 2016/0102916 A1 | 4/2016 | Hartung |
| 2018/0282836 A1 | 10/2018 | Gusarova |

FOREIGN PATENT DOCUMENTS

| | | |
|---|---|---|
| CN | 103447314 | 12/2013 |
| CN | 104561518 | 4/2015 |
| DE | 2817742 | 10/1979 |
| JP | 0275944 | 3/1990 |
| JP | 0933455 | 2/1997 |
| JP | 2010121200 | 6/2010 |
| WO | 2016189144 | 12/2016 |
| WO | 2017050311 | 3/2017 |

OTHER PUBLICATIONS

Wadley, Haydn NG. "Cellular metals manufacturing." Advanced engineering materials 4.10 (2002): pp. 726-733. (Year: 2002).*

Cai, W., S. Jack Hu, and J. X. Yuan. "Deformable sheet metal fixturing: principles, algorithms, and simulations." (1996): pp. 318-324. (Year: 1996).*

* cited by examiner

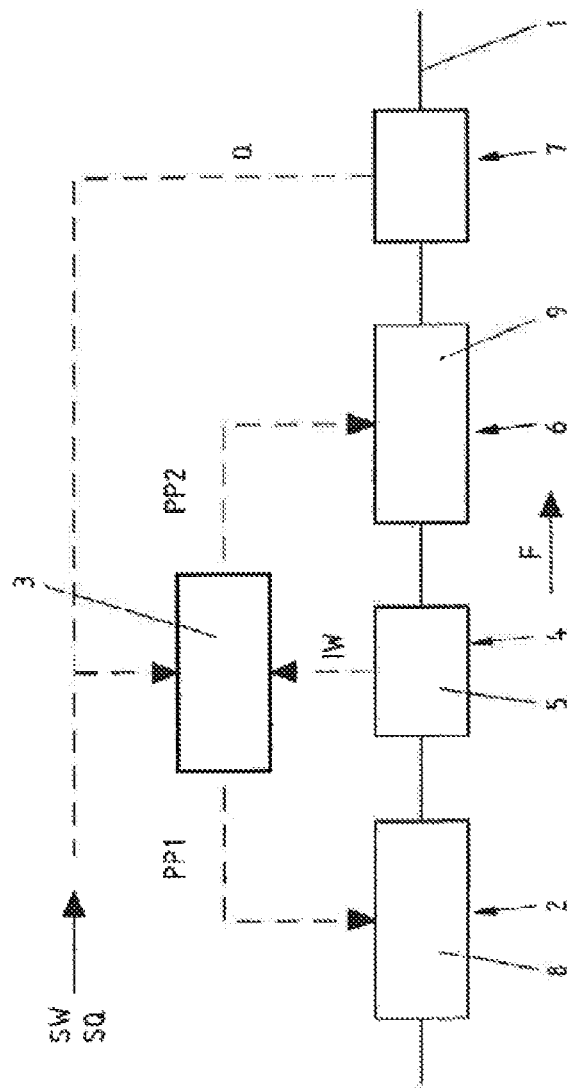

METHOD FOR ROLLING AND/OR HEAT TREATING A METAL STRIP

RELATED APPLICATIONS

This application is a National phase application of an International application PCT/EP2017/054978 filed Mar. 3 2017 and claiming priority of German applications DE 10 2016 204147.9 filed Mar. 14, 2016 and DE 10 2016 222 644.4 filed Nov. 17, 2016, all of the three applications are incorporated herein by reference thereto.

The invention relates to a method of rolling and/or heat treating a metallic product, in particular a strip, wherein the product is subjected at a first position to a rolling and/or heat treating operation which is controlled and/or regulated by a by a control device and/or regulating device, wherein the product is subjected at a second position downstream from the first position to a measuring by a measuring device, wherein the product is subjected at a third position downstream from the second position to another working operation, and wherein the product is present at a fourth position downstream from the third position in a given quality.

The given quality can be, but does not have to be, the final quality of the product, wherein the product is in particular a strip or a sheet. The sequence of the cited positions is to be understood in particular along a transport direction or in the sense of the production sequence. It is noted in conjunction with the present invention that the concept of the product includes in particular metal strips or sheets.

The following relates to a method of rolling or heat treating a strip or sheet is striven for in the following but is not, however, strictly so in general, any metal products are possible.

The mechanical qualities of a metal product which are present at the end of its manufacture belong to the essential criteria for the quality of a final product manufactured from the metal product. These mechanical qualities are essentially determined by the microstructure of the material of the strip.

At the present time, during the manufacture of a qualitatively high-grade metal strip the procedure is set according to a precisely defined process whose benchmark data is largely fixed. Therefore, the manufacturing parameters are held at such a level that the required quality of the strip is ensured. In particular, manufacturing parameters such as the temperature, transport speed of the strip in the manufacturing system and the rolling forces are determined and monitored which, however, only indirectly correlate with the microstructure of the strip. Customary changes within the total process chain can shift the correlation between the measured parameters in the microstructure of the strip in such a manner that the strip then no longer has the required mechanical properties. For example, even relatively small deviations in the chemical composition during the production of two-phase steel can shift the necessary temperature profile necessary for the desired components of austenite and ferrite during the heat treatment in such a manner that the product is too brittle or too soft.

The production process can be improved if more precise information about the microstructure and the mechanical qualities are available during the production process. The following are possibilities which allow this:

A computer model can be used which takes as basis the available, measurable parameters such as temperature and chemical composition as well as rolling forces in order to calculate one or more parameters which correlate with the microstructure of the material and the mechanical qualities in order to adapt the manufacturing process in this manner.

Online measurements can also be carried out which detect qualities of the strip which are determined by the microstructure of the material in order to influence in this way the manufacturing process by a control device.

As regards the first-cited possibility of using a computer model such as is described, for example, in EP 2 742 158 B1, there is the disadvantage that expensive development efforts must be undertaken in order to make this method stabile in a usable manner A model is used in the cited publication which calculates the mechanical qualities after the heat treatment which are based on one or more parameters stemming from the process before or during the heat treatment. In order to maintain this method stabile, data is required which is not always available. Furthermore, the data is required from previously running processes which must be assigned to corresponding, individual segments of the strip, which is occasionally difficult in practice.

There are various previously known solutions for the monitoring and controlling of a generic or similar process, for which the following documents are referred to: DE 28 17 742 C2, EP 0 189 040 B1, JP 9033 455 A, EP 1 233 265 A1, DE 11 2004 002 759 T5, U.S. Pat. No. 7,092,843 B2, US 2010/0219567 A1, EP 2 557 183 A1, DE 10 2013 225 279 A1 and JP 2075 744 A.

However, there was no method up to the present which ensured in a sufficiently simple manner a stabile control and regulation of a given quality of a metal product after the heat treatment and the rolling.

Therefore, the invention has the basic task of further developing a generic method in such a manner that the quality of the manufactured product can be increased. Recourse should be made here to known and stably operating measuring methods which are used in such a manner that the cited target can be readily and economically achieved.

The solution of this task by the invention is characterized in that the method comprises the steps:
a) measuring the value of a material quality of the product at the second position, wherein the material quality reproduces the microstructure of the product material or concerns a parameter which correlates with the microstructure of the product material;
b) Conducting the value of the material quality measured at the second position to the control device and/or regulating device, comparison of the measured value with a value stored in the control device and/or regulating device and adaptation of at least one parameter of the rolling and/or heat treatment operation in as far as the measured value of the material quality deviates from the stored value outside of an admissible tolerance,
c) Measuring of at least one value of a quality-material property of the product at the fourth position, wherein the quality-material property reflects a quality criterion of the product or relates to a parameter which correlates with a quality criterion of the product;
d) Comparison of the measured value of the quality-material property with a stored value for the quality-material property and bringing about at least one step for influencing the quality-material property in as far as the measured value of the quality-material property deviates from the stored value outside of an admissible tolerance.

The measuring according to the above step a) is or preferably comprises the irradiating of the product with X-ray radiation and the determining of the diffraction of the X-ray radiation (X-ray diffraction) on the crystalline structure of the product material.

As an alternative, it can be provided that the measuring according to the above step a) is or comprises the measuring of magnetic qualities of the product material.

Furthermore, it can be alternatively provided that the measuring according to the above step a) is or comprises a laser ultrasound measuring of the product material.

The rolling can be a heat rolling of strip and the second position can be behind the finished position or inside a cooling stretch and the fourth position can be inside of or at the end of a cooling stretch or between a cooling stretch and a reel.

The heat treatment can take place in a continuous annealing line or in a hot galvanizing, wherein the second position is preferably after or in a heating zone or in or after a halting zone or in or after a slow cooling or in or after a rapid cooling, and the fourth position is in or after a halting zone or in or after a slow cooling or in or after a rapid cooling or in or after an overaging furnace or between an overaging furnace and a reel.

The rolling can be a rolling of a sheet or of a thick metal plate, wherein the second position is preferably in or after a framework area or in or after a cooling stretch and the fourth position is within or at the end of a cooling stretch or in or after a cooling bed.

One of the adapted technological parameters can be the reduction thickness, the product temperature, the transport speed, the cooling-off rate, the heating-up rate, the holding time, the furnace temperature, the rolling force and/or the amount of water.

Furthermore, the method can comprise the step: e) comparison of the value of the material quality measured at the second position with a value stored in the control device and/or regulating device and adaptation of at least one parameter of the further working operation to the extent that the measured value of the material quality deviates from the stored value beyond an admissible tolerance. In this case, it can be provided that one of the adapted parameters is the reduction in thickness, the product temperature, the transport speed, the cooling-off rate, the heating-up rate and/or the holding time.

A measure taken in accordance with the above step d) can be an adaptation of at least one parameter of the rolling and/or heat treatment operation, an adaptation of at least one parameter of the further working operation and/or an adaptation of the value for the material quality, which value is stored according to the above step b) in the control device and/or regulating device. In general, however, even other values can be changed in the control device and/or regulating device. A computer model can be used for said adaptation of the at least one parameter and/or for the adaptation of the values stored in the control device and/or regulating device.

A further development provides that a corresponding number of packages can be wound from a number of manufactured strips or sheets, wherein according to the above step d) the adaptation of the values for the material quality stored according to the above step b) takes place in the control device and/or regulating device in the production of a manufactured strip or sheet for the production of a strip or sheet which is manufactured later.

The material quality of the product can be, for example, the phase state, the structure, the grain size and/or the degree of recrystallization, the texture and/or the anisotropy of the product material.

The quality-material property of the product can be the phase state and/or the elastic limit and/or the tensile strength and/or the R value and/or the elongation at break and/or the magnetic qualities and/or the grain size of the product material.

The determining of the quality-material property can take place by a traction test, by the irradiation of the product with X-ray radiation and the determining of the diffraction of the X-ray radiation (X-ray diffraction) on the crystalline structure of the product material, by the measuring of magnetic qualities of the product material or by a laser ultrasound measuring on the product material.

At least one measured or derived value from the determination of the material quality can be employed for determining the quality-material property and used to improve the accuracy of the determining of the quality-material property.

At least one measured or derived value from the determination of the quality—material property can be employed for determining the material quality and used to improve the accuracy of the determining of the material quality.

The above-cited measuring of the value of a material quality of the strip can take place at the second position, wherein the strip has a temperature of at least 200° C.

Therefore, the invention aims for an online measuring of the metal strip during its manufacture in order to improve the quality of the strip and of the products made from it.

The present invention allows an improvement of the control or regulating of the manufacturing process for a metal product, in particular for a strip or a sheet, using online measurements and the monitoring of the final quality of the strip. The invention is used in particular in the heat treatment or in the hot rolling of a metallic strip.

It is provided that a measuring system is installed which is suitable for monitoring the microstructural qualities during the manufacture, as a result of which on the one hand a simple regulation (in a closed regulating loop) is possible for the traversed processes (in particular in the direction of transport), and on the other hand a control (non-closed control) is possible for present or coming processes (in particular in the direction of transport). The microstructure of the strip material has a good correlation with the mechanical qualities present at the end; in particular there is a better correlation than when the temperature or the speed of the product (i.e., in particular of the strip) is monitored as process magnitude. Therefore, no expensive computer model is advantageously necessary for determining the material qualities at the end of the process.

However, the online monitoring of the microstructure of the product material (i.e., in particular of the strip) is difficult, which results from the requirement of a destruction-free, continuous, robust and precise measuring within the rough environmental conditions. Furthermore, the finding of suitable target magnitudes for the regulating in the closed control circuit and suitable control data for an open control (that is, in the non-closed regulating circuit) requires a great expense. Accordingly, suitable correlations must be present between the desired data concerning the material qualities present at the end of the process with the measured microstructural qualities at the measuring site. However, such correlations can be obtained in a professional manner based on laboratory experiments and the experimental values gained from practice.

The possibility which is preferably provided by the present invention for determining microstructural qualities of the product material (i.e., in particular of the strip) is X-ray diffraction (X-ray diffraction) which utilizes the diffraction of an X ray beam as the function of the interval of the crystals in the crystalline structure of the metal. A detector measures the intensity of the X-ray beam as a function of the diffraction angle. This data can be used to obtain a parameter which describes the microstructure of the irradiated material such as, for example, the crystallinity, the phase composition, the grain size, the internal and external stresses as well as the structure. This technology is known and the following documents are referred to by way of examples: JP 2005 171 324 A, EP 0 189 040 B1, DE 23 40 028 A1 and WO 2006/047267 A2. However, the using of online measurements for the material qualities is not widespread for monitoring the manufacturing process of a metal strip. Previous solutions normally take into account here a collecting of data in order to achieve a simple control according to given target magnitudes. A simple method for determining suitable target values was not previously known.

According to the present invention at least one measurement is carried out which takes place with a product (i.e., in particular a strip) which preferably has a temperature of 200° C. in order to determine a material quality (IW). This material quality is the quality of the microstructure of the product material or such a one which correlates with the microstructure of the product material. X-ray diffraction is preferably used, however, the measuring of magnetic qualities or a laser ultrasonic measuring are alternatives. At least one manufacturing parameter is controlled and/or regulated by the control device and/or regulating apparatus according to the measured result, wherein the determined measured value is taken as base. The quality of the finished product at the end of the process, that is, after the heat treatment, can be determined by another measuring element and taken into account for the further process.

If the measured value deviates from a given theoretical value, a subsequent regulating of the appropriate process parameter of the previously running process (that is, of the process that was prior to the measuring—preferably in the direction of transport of the strip) can take place by the control device and/or regulating apparatus. Furthermore, a subsequent process (that is, a process which follows the measuring in the direction of transport) from the control device and/or regulating apparatus can be changed by the measured value.

The theoretical value can be calculated here by a process which is determined by at least one parameter which is obtained before or during the heat treatment of the product material.

The theoretical value or a method for determining the theoretical value can be adapted for subsequent packages if the material quality present at the end of the process deviates from a target value.

This adaptation of the manufacturing parameters can be regulated (in particular for the processes preceding the measuring) as well as controlled (in particular for the processes subsequent to the measuring). This applies with regard to the measuring during the process and also for a concluding measuring of the quality of the product.

The measured values for the material quality during the manufacturing process of the product as well as regards the given quality of it can also be used to improve the parameters for computer models.

The measuring device can be changed as regards his position in the direction of transport and also in the direction transverse to it in order to carry out measurements at suitable points of the product and in this manner to optimally recognize the material qualities and the quality of the product.

The measuring device can also be arranged at the end of a slow or of a rapid cooling stretch. It can also be arranged within the water cooling in a hot rolling mill.

The measuring device measures at least one peak value, preferably by X-ray diffraction, for the phases of the material of interest. This measuring method has especially proven itself in the case of the present invention.

The data measured with the measuring device allows the improving of the prediction of the mechanical qualities of the metal strip by a destruction-free quality control. The lack of destruction is ensured by the above-cited measuring devices.

The metal strip can be examined by the destruction-free measuring during the process as well as at the end of it. The measured values can be brought in a correlation with the mechanical qualities of the product which are present at the end of the process so that an improved control and prediction of the given quality of the product becomes possible in an online method.

To this end the microstructure of the product material is purposefully measured over the entire length of the product during the manufacturing process, which makes it possible to monitor the quality of the part produced from the product and to maintain it at a sufficient level.

In this manner the manufacturing costs including, if necessary, any valid subsequent costs due to a lack of quality of the strip can be reduced.

The purposeful monitoring and evaluation of the microstructure of the strip material make the use of the following advantages possible:

The production process of the strip can be adapted to the determined microstructure of the material, which can achieve a uniform quality of the strip over its length.

Given an improved quality of the strip, rejection costs for defective products are reduced and therefore subsequent costs (on account of too low a quality of the strip of which the product consists) are avoided.

As a result of the purposeful monitoring of the microstructure of the strip material, the manufacturing process can be further optimized since the direct measuring makes it possible to adapt and reduce safety thresholds in the manufacture.

Fluctuations in the product qualities can originate in previously stored processes. An essential advantage of the suggested method is that a better process control is possible, even if no concrete knowledge about the previous processes is present.

The drawing shows an exemplary embodiment of the invention. The sole FIGURE schematically shows the manufacturing process of a steel strip.

The FIGURE schematically shows an example for a process with which a metal strip 1 (steel strip) is manufactured. The process shown is a continuous heat treatment process of a strip in which the strip 1 is heated in a required temperature range.

A first position 2 can be recognized at which a furnace 8 is arranged. A measuring device 5, which is arranged at a second position 4, follows in the transport direction F. A cooling device 9 further follows at a third position 6 in the transport direction F. A quality measuring of the present quality of the strip 1 takes place at a following, fourth position 7 in the transport direction F.

The entire production process of the strip 1 is controlled and regulated by a control device and/or a regulating device 3, wherein a manufacturing parameter PP1 is set for the furnace 8 and a manufacturing parameter PP2 for the cooling device 9.

A value SW for a material quality of the strip 1 is set for the control device and/or regulating device 3 and a value SQ for a quality-material property of the strip 1. Therefore, the cited values are theoretical values.

The measuring device 5 determines a material quality IW of the strip 1, therefore an actual value.

A measuring of a quality-material property Q of the strip 1 takes place in the range of the fourth position 7.

The measuring device 5 is therefore located behind the furnace 8 and measures (optionally after a cooling down of the strip 1 by watering), preferably by X-ray diffraction, a quality of the strip 1 which allows a conclusion to be made about the microstructure of the strip 1, for example, the components of the particular phases in the material. This measured value IW is used to regulate the heating process via the parameter PP1 so that the measured phase components in the material of the strip 1 do not leave the given, stored value SW and stay within a given tolerance.

Based on the measured measuring value IW, the process in the furnace 8 can be operated in a closed regulating circuit by the control device and/or the regulating device 3; the following process in the cooling device 9 can in the meantime be operated as an open controlling circuit by the control device and/or the regulating device 3.

After the finishing of the strip, the quality of the strip 1, that is, the quality material property Q, can be measured at the fourth position 7.

This current actual value of the quality material property Q can be given to a software and/or to a computer model which then modifies or adapts in the manner of a learning algorithm the given, stored values SW and/or the control parameters for the cooling device 9 so that in the production of other packages, optimized and/or adapted manufacturing parameters are taken as a basis. This can bring it about that other packages are manufactured with an improved adaptation to desired mechanical qualities. Likewise, the measured values of the measuring device 5 can also be used in the cited sense in order to improve the manufacture of other packages.

It is also noted regarding the exemplary embodiment that instead of the furnace 8, naturally, even other elements for processing the material can be arranged in other embodiments of the invention, in particular a rolling mill or a cooling device.

LIST OF REFERENCE NUMERALS

1 strip
2 first position
3 control device and/or regulating device
4 second position
5 measuring device
6 third position
7 fourth position
8 furnace
9 cooling device
IW material quality of the strip
Q quality-material property of the strip
SW stored value for material quality (theoretical value)
SQ stored value for quality-material property (theoretical value for the quality)
PP1 parameter
PP1 parameter
F direction of transport

The invention claimed is:

1. A method of rolling and/or heat treating a metallic product (1), in particular a strip or sheet, wherein the product (1) is subjected at a first position (2) to a rolling and/or heat treating operation which is controlled and/or regulated by a control device and/or regulating device (3), wherein the product (1) is subjected at a second position (4) downstream from the first position (2) to a measuring by a measuring device (5), wherein the product (1) is subjected at a third position (6) downstream from the second position (4) to another working operation, and wherein the product (1) is present at a fourth position (7) downstream from the third position (6) in a given quality, wherein the quality of the product is characterized by the quality-material property (Q) of the product (1) in form of phase condition, and/or yield strength, and/or tensile strength, and/or fracture elongation, and/or grain size, characterized in that
the method comprises the steps of:
a) Measuring the value of a material quality (1W) of the product (1) at the second position (4), wherein the material quality (1W) reproduces the microstructure of the product (1) material or concerns a parameter which correlates with the microstructure of the product (1) material, wherein, the measurement is or includes irradiating the product (1) with an ex-ray radiation and determining diffraction of the x-ray radiation (x-ray diffraction) on a crystalline structure of the material of the product (1);
b) Conducting the value of the material quality (1W) measured at the second position (4) to the control device and/or regulating device (3), comparison of the measured value with a value (SW) stored in the control device and/or regulating device (3) and adaptation of at least one parameter (PP1) of the rolling and/or heat treatment operation in as far as the measured value of the material quality deviates from the stored value (SW) outside of an admissible tolerance;
c) Measuring of at least one value of a quality-material property (Q) of the product (1) at the fourth position (7), wherein the quality-material property (Q) reflects a quality criterion of the product (1) or relates to a parameter which correlates with a quality criterion of the product (1);
d) Comparison of the measured value of the quality-material property (Q) with a stored value for the quality-material property and bringing about at least one step for influencing the quality-material property (Q) in as far as the measured value of the quality-material property (Q) deviates from the stored value outside of an admissible tolerance.

2. The method according to claim 1, characterized in that the rolling is a heat rolling of strip and the second position (4) is behind the finished position or inside a cooling stretch and the fourth position (7) is inside of or at the end of a cooling stretch or between a cooling stretch and a reel.

3. The method according to claim 1, characterized in that the heat treatment takes place in a continuous annealing line or in a hot galvanizing, wherein the second position (4) is preferably after or in a heating zone or in or after a halting zone or in or after a slow cooling or in or after a rapid cooling, and the fourth position (7) is in or after a halting zone or in or after a slow cooling or in or after a rapid cooling or in or after an overaging or between an overaging and a reel.

4. The method according to claim 1, characterized in that the rolling is a rolling of a sheet or of a thick metal plate, wherein the second position (4) is preferably in or after a framework area or in or after a cooling stretch and the fourth position (7) is within or at the end of a cooling stretch or in or after a cooling bed.

5. The method according to claim 1, characterized in that one of the adapted technological parameters (PP1) is the reduction thickness, the product temperature, the transport speed, the cooling-off rate, the heating-up rate, the holding time, the furnace temperature, the rolling force and/or the amount of water.

6. The method according to claim 1, characterized in that furthermore, the method comprises the step:
   e) comparison of the value of the material quality (1W) measured at the second position (4) with a value stored in the control device and/or regulating device (3) and adaptation of at least one parameter (PP2) of the further working operation to the extent that the measured value of the material quality (1W) deviates from the stored value beyond an admissible tolerance.

7. The method according to claim 6, characterized in that one of the adapted technological parameters (PP2) is the reduction thickness, the product temperature, the transport speed, the cooling-off rate, the heating-up rate and/or the holding time.

8. The method according to claim 1, characterized in that a measure taken in accordance with step d) in claim 1, is an adaptation of at least one parameter of the rolling and/or heat treatment operation, an adaptation of at least one parameter of the further working operation and/or an adaptation of the values (SW) for the material quality (1W) and stored according to step b) of claim 1 in the control device and/or regulating device (3).

9. The method according to claim 8, characterized in that a computer model is used for the adaptation of the at least one parameter and/or for the adaptation of the values (SW) stored in the control device and/or regulating device (3).

10. The method according to claim 1, characterized in that a corresponding number of packages is wound from a number of manufactured strips or sheets, wherein according to step d) of claim 1 the adaptation of the values (SW) for the material quality (1W) stored in the control device and/or regulating device (3) according to the step b) in claim 1 takes place in the production of a manufactured strip (1) or sheet for the production of a strip (1) or sheet which is manufactured later.

11. The method according to claim 1, characterized in that the material quality (1W) of the product (1) is the phase state, the structure, the grain size, degree of recrystallization, the texture and/or the anisotropy of the product (1) material.

12. The method according claim 1, characterized in that the determining of the quality-material property (Q) takes place by a test, by the irradiation of the product (1) with X-ray radiation and the determining of the diffraction of the X-ray radiation (X-ray diffraction) on the crystalline structure of the product (1) material.

13. The method according to claim 1, characterized in that at least one measured or derived value from the determination of the material quality (1W) is employed for determining the quality-material property (Q) and used to improve the accuracy of the determining of the quality-material property (Q).

14. The method according to claim 1, characterized in that at least one measured or derived value from the determination of the quality-material property (Q) is employed for determining the material quality (1W) and is used to improve the accuracy of the determining of the material quality (1W).

* * * * *